(12) United States Patent
Ress et al.

(10) Patent No.: US 9,242,394 B2
(45) Date of Patent: Jan. 26, 2016

(54) METHOD FOR HEATING A FIBER/PLASTIC COMPOSITE MATERIAL

(75) Inventors: Christian Ress, Walzbachtal (DE); Rudolf Emmerich, Kuppenheim (DE); Matthias Graf, Pfinztal (DE); Helfried Urban, Bretten (DE); Ruediger Braeuning, Kraichtal (DE)

(73) Assignee: Fraunhofer-Gesellschaft Zur Foerderung Der Angewandten Forschung E.V., Munich (DE)

( * ) Notice: Subject to any disclaimer, the term of this patent is extended or adjusted under 35 U.S.C. 154(b) by 742 days.

(21) Appl. No.: 13/277,804

(22) Filed: Oct. 20, 2011

(65) Prior Publication Data

US 2012/0160834 A1 Jun. 28, 2012

(51) Int. Cl.
| | |
|---|---|
| H05B 6/64 | (2006.01) |
| H05B 6/70 | (2006.01) |
| H05B 6/72 | (2006.01) |
| B29C 35/08 | (2006.01) |
| B29C 70/06 | (2006.01) |
| H01Q 1/36 | (2006.01) |
| H01Q 9/40 | (2006.01) |

(Continued)

(52) U.S. Cl.
CPC ............. *B29C 35/0805* (2013.01); *B29C 70/06* (2013.01); *H01Q 1/36* (2013.01); *H01Q 9/40* (2013.01); *H01Q 13/08* (2013.01); *B29C 35/0266* (2013.01); *B29C 2035/0855* (2013.01)

(58) Field of Classification Search
CPC .............. B29C 35/08; B29C 35/0805; B29C 2035/0855; B29C 2035/0861; B32B 2310/08; B32B 2310/0806; B32B 2310/0868; B29D 11/00817; B29D 11/00826

USPC ......... 219/678, 690–693, 694, 695, 748, 756, 219/759, 761; 332/132, 166, 129; 331/5; 329/332; 427/508, 553, 575, 595, 904; 264/417, 420, 432, 474, 489; 343/895

See application file for complete search history.

(56) References Cited

U.S. PATENT DOCUMENTS

| | | | | |
|---|---|---|---|---|
| 4,554,608 | A | * | 11/1985 | Block ............................ 361/119 |
| 4,777,336 | A | * | 10/1988 | Asmussen ...................... 219/696 |

(Continued)

FOREIGN PATENT DOCUMENTS

| | | |
|---|---|---|
| DE | 33 26 514 A1 | 1/1984 |
| DE | 33 31 432 C2 | 3/1991 |

(Continued)

OTHER PUBLICATIONS

Nakano, et al; A Card-type, Fan-shaped Antenna for Wide Band Operation, International Journal of Microwave and Optical Technology, vol. 1, No. 1, Jun. 2006.*

(Continued)

*Primary Examiner* — David Angwin
*Assistant Examiner* — Gyounghyun Bae
(74) *Attorney, Agent, or Firm* — Tarolli, Sundheim, Covell & Tummino LLP

(57) ABSTRACT

A method for heating a fiber/plastic composite material (FPC) comprising at least one layer (L) of carbon fibers (F) in a plastic matrix (P) includes inducing a magnetic field (MF) by means of a microwave antenna (MA) in the fiber/plastic composite material (FPC), and the field direction of the magnetic field (MF) runs in a plane of the layer (L) of carbon fibers (F).

8 Claims, 4 Drawing Sheets

C fiber structure     magnetic field     inducted current

(51) Int. Cl.
*H01Q 13/08* (2006.01)
*B29C 35/02* (2006.01)

(56) References Cited

U.S. PATENT DOCUMENTS

| | | | |
|---|---|---|---|
| 4,819,003 A | | 4/1989 | Goto et al. |
| 5,032,327 A | * | 7/1991 | Becheret ................. 264/489 |
| 5,057,106 A | * | 10/1991 | Kasevich et al. ............. 606/33 |
| 5,126,521 A | * | 6/1992 | McGaffigan ................. 219/660 |
| 5,576,358 A | * | 11/1996 | Lem et al. ................. 523/153 |
| 5,798,395 A | * | 8/1998 | Lauf et al. ................. 522/1 |
| 5,804,801 A | * | 9/1998 | Lauf et al. ................. 219/759 |
| 6,104,934 A | * | 8/2000 | Patton et al. ................. 455/561 |
| 6,259,077 B1 | * | 7/2001 | Drozd et al. ................. 219/693 |
| 6,271,148 B1 | * | 8/2001 | Kao et al. ................. 438/727 |
| 6,831,259 B2 | * | 12/2004 | Muegge ................. B27N 3/18 156/379.6 |
| 6,849,837 B2 | * | 2/2005 | Riess et al. ................. 219/634 |
| 6,939,477 B2 | * | 9/2005 | Stark et al. ................. 252/62.54 |
| 7,223,087 B2 | * | 5/2007 | Akopyan ................. 425/174 |
| 2007/0095823 A1 | * | 5/2007 | Sedlmayr ................. H05B 6/72 219/688 |

FOREIGN PATENT DOCUMENTS

| | | |
|---|---|---|
| DE | 92 00 660 U1 | 4/1992 |
| DE | 199 37 359 C2 | 6/2001 |
| DE | 101 57 601 A1 | 6/2003 |
| DE | 10 2006 044 487 A1 | 4/2008 |
| GB | 2127259 A * | 4/1984 |
| JP | 8213820 A | 8/1996 |
| JP | 2006270494 A | 10/2006 |
| JP | 2008166856 A | 7/2008 |
| WO | 03/023901 A1 | 3/2003 |

OTHER PUBLICATIONS

Balzer, Brian B., et al., "Significant Effect of Microwave Curing on Tensile Strength of Carbon Fiber Composites", Journal of Industrial Technology, vol. 24, No. 3, Jul. 2008-Sep. 2008.

* cited by examiner

C fiber structure      magnetic field      inducted current

METHOD FOR HEATING A FIBER/PLASTIC COMPOSITE MATERIAL

RELATED APPLICATION

This application claims priority from German Application No. 10 2010 042 820.5, filed Oct. 22, 2009, the subject matter of which is incorporated herein by reference in its entirety.

FIELD OF THE INVENTION

The present invention relates to a new method for heating a fiber/plastic composite material, as well as to a microwave antenna that can be used for this method.

BACKGROUND OF THE INVENTION

Carbon fibers are used as reinforcement fibers in high-performance plastics. In general, thermoplastic and duroplastic polymers are used as matrix materials; they are melted or cross-linked, with the introduction of heat. Polymers are poor heat conductors, so that it takes a long time until the appropriate temperature is achieved by way of heat conduction or convection.

Microwaves are suitable for heating absorbent materials, independent of heat conduction. However, carbon fibers are electrically conductive and generally block off microwaves. Up to the present, it has only been possible to heat carbon fibers that predominantly run unidirectionally, using microwaves, with good results.

Up to the present, there has been no specific solution for this problem. It is known to heat plastics reinforced with carbon fibers, using microwaves, in a so-called multi-mode microwave oven. It is a disadvantage of this method of procedure that very many different directions of the electrical or magnetic field, respectively, are present in conventional microwave ovens. Thus, only a small part of the magnetic fields has a direction that allows heating of the fiber/plastic composite material. Furthermore, shielding effects of the electrical or magnetic fields take place, and this additionally minimizes the effectiveness of known devices. As a result, strong heating of the edges of the fiber/plastic composite materials is observed in conventional microwave ovens, while the center of the component remains relatively cold. This problem was alleviated using so-called thermoelectric films. These films are laid onto the fiber/plastic composite materials and heat up by means of absorption of microwaves, and thereby heat the structure up indirectly.

Accordingly, it is the task to make available a method that eliminates the problems indicated above. It is particularly the task of the present application to make available a method for effectively heating fiber/plastic composite materials directly, by means of microwave energy.

It is the recognition of the present invention that the magnetic field is oriented relative to the plane of the fiber structure of the fiber/plastic composite material in such a way that an electrical current is induced perpendicular to the plane.

Accordingly, the present invention is directed at a method for heating a fiber/plastic composite material (FPC) comprising at least one layer (L) of carbon fibers (F) in a plastic matrix (P), where a magnetic field (MF) is induced by means of a microwave antenna (MA), and the field direction of the magnetic field (MF) runs in the plane of the layer (L) of carbon fibers (F). By means of this method, an electrical current is induced perpendicular to the layers.

Fiber/plastic composite materials (FPC) are sufficiently known. In this connection, carbon fibers (F) are built into the plastic matrix (M) as reinforcement. Preferably, a fiber/plastic composite material (FPC) has multiple layers of carbon fibers (F). The number of layers (L) depends on the components to be produced. In general, a fiber/plastic composite material (FPC), such as in prepregs, for example, has 1 to 200, particularly 10 to 100, layers (L). Preferably, these layers (L) are oriented parallel, particularly plane-parallel, relative to one another, where it is desirable, in order to increase the rigidity of the fiber/plastic composite material (FPC), if the layers (L) are arranged, relative to one another, in such a manner that the carbon fibers (F) of the individual layers (L) run transverse to one another. Furthermore, a layer (L) can consist not just of parallel carbon fibers (F), but rather of a woven carbon fiber fabric, in which the carbon fibers (F) run not only parallel but rather also orthogonal to one another. The thickness of the individual layers is decisively determined by the diameter of the carbon fibers (F).

With regard to the plastic matrix (P), the most varied polymers can be used. Preferably, these are duroplastics, thermoplastics, or mixtures of duroplastics and thermoplastics.

Duroplastics are preferably selected from the group consisting of epoxies, polyesters, polyurethanes, and phenols. Thermoplastics, on the other hand, are preferably selected from the group of technical thermoplastics, consisting of polyamide, polyetherketone, polyimide, polysulfone, polyethersulfone, and polyester. In a special embodiment, the plastic matrix (P) comprises, in particular, the plastic matrix (P) consists of, a thermoplastic such as polyetheretherketone, polyetherketone and/or polyamide.

The carbon fibers (C) [Translator's Note: above, F was used to refer to carbon fibers; it is used again further below] that are used in the present invention are conventional carbon fibers (C). Carbon fibers (C) are industrially manufactured fibers made from carbonaceous starting materials, such as cellulose, polyacrylonitrile or pitch, which are converted to carbon disposed in graphite manner, by means of pyrolysis. In the present application, anisotropic types, in particular, are used.

It is an essential aspect of the present application that a magnetic field (MF), i.e. a magnetic field direction, is produced for heating a fiber/plastic composite material (FPC), which field runs in the plane of at least one of the layers (L) of the fiber/plastic composite material (FPC) to be heated (see FIG. 1).

Heating according to the present invention is particularly understood to mean that the fiber/plastic composite material (FPC), above all the plastic matrix (P), is heated to 500° C., particularly 400° C., in the case of high-performance thermoplastics, and preferably to 50 to 400° C., such as 100 to 250° C., in the case of duroplastic polymers.

The expression "in the plane" preferably indicates that the magnetic field (MF), i.e., the magnetic field direction, runs lateral to the carbon fibers (C) of the layer (L), i.e., in the plane of the layer (L).

It is particularly preferred that the fiber/plastic composite material (FPC) is exposed to only one magnetic field direction (field mode) and not, as in the case of conventional processes, to multiple magnetic (and also electrical) field directions, which particularly occur due to reflection at the oven walls. Consequently, it is preferred that the method is conducted in a (closed) system that is primarily dimensioned in such a manner that reflections can be ignored. Consequently, the height, length, and depth of this system amount to at least 5λ, preferably at least 8λ, of the emitted electromagnetic wave, i.e. of the magnetic field (MF). It is also possible that the walls of the system are configured in such a manner that reflection of magnetic (and electrical) waves is avoided. Possible materials for this are microwave-absorbing materials, such as, for example, carbonaceous polymers, materials that contain water, etc.

The advantage of the oriented magnetic field (MF) is that an electrical current (EC) runs exclusively orthogonal to the plane of the layer (L) of carbon fibers (F), and thus into the interior of the fiber/plastic composite material (FPC).

It has proven to be particularly advantageous that the microwave antenna (MA) is brought close to the fiber/plastic composite material (FPC) to be heated. Consequently, it is preferred that the microwave antenna (MA) is placed 50 mm or less (e.g., 0.5 to 50 mm), particularly 10 mm or less (e.g., 0.5 to 10 mm), such as 1 to 10 mm, above the fiber/plastic composite material (FPC) during heating.

By means of the closeness of the microwave antenna (MA) to the fiber/plastic composite material (FPC), the microwave antenna (MA) and at least one layer (L) of carbon fibers (F) form a common system, which must also be considered as such, in terms of electrodynamic aspects, i.e. the carbon fiber structure has a very decisive influence on the field orientation.

The magnetic field (MF) of the microwave preferably has a free space wavelength $\lambda$ of 0.1 cm to 100.0 cm, preferably of 3.0 cm to 30.0 cm.

It has turned out that the method described above can particularly be carried out with a new type of microwave antenna (MA).

This microwave antenna (MA) preferably comprises a shaft (S) and a planar metal surface (MS), where
  (a) the shaft (S) comprises an inner conductor (IC) and an outer conductor (OC), where the inner conductor (IC) and the outer conductor (OC) are separated by means of a dielectric (D), and the inner conductor (IC) and outer conductor (OC) run coaxial to one another,
  (b) the metal surface (MS) has the shape of a circle sector (CS) having an angle of 1° to 180° and a radius of 0.1 cm to 60.0 cm,
  (c) one end of the inner conductor (IC) is connected with the tip of the metal surface (MS) that is assigned to the angle of 1° to 180°, where the inner conductor (IC) forms an angle between 0° and 180° with the plane of the metal surface (MS) (see FIGS. 2a, 2b, 4a, and 4b).

For a more precise understanding of the microwave antenna (MA) in its preferred embodiments, reference is explicitly made to FIGS. 2a, 2b, 4a, and 4b.

Preferably, the shaft (S) is round, with a diameter of 10 to 150 mm, preferably of 20 to 60 nm, particularly of 25 to 35 mm, such as 32 mm. The length of the shaft (S) amounts to at least 30 mm in a preferred embodiment.

The inner conductor (IC) preferably has a diameter of 2 mm to 60 mm, particularly 2 mm to 20 mm, such as 5 mm to 10 mm, particularly preferably 8 mm.

The dielectric (D) is preferably air.

Particularly good results are achieved if the shaft end that is connected with the metal surface (MS) has only the inner conductor (IC). The length of the shaft section that has only the inner conductor (IC) results from the electromagnetic wave to be produced. Consequently, it is preferred that the shaft (S) has only the inner conductor (IC) $\lambda/2$ to $\lambda/6$, particularly $\lambda/3$ to $\lambda/5$, such as $\lambda/4$, in front of the shaft end that is connected with the metal surface (MS), where "$\lambda$" is the wavelength of the microwave having a length of 0.1 cm to 100 cm, preferably of 3.0 cm to 30.0 cm. Accordingly, it is preferred that the shaft (S) has only the inner conductor (OC) 0.1 cm to 25.0 cm, particularly 0.5 to 15.0 cm, in front of the shaft end that is connected with the metal surface (MS).

The second essential structural characteristic of the microwave antenna (MA) is the planar metal surface (MS). This planar metal surface (MS) preferably has the shape of a circle sector (CS), with:
  (a) an angle of 1° to 180°, preferably of 70° to 120°, particularly of 80° to 100°, such as 90°, and/or
  (b) a radius of 0.1 cm to 60.0 cm, preferably of 0.2 cm to 60.0 cm, particularly of 1.0 cm to 20.0 cm.

The radius preferably results from the wavelength of the microwave. Consequently, it is preferred that the metal surface (MS) in the shape of a circle sector (CS) has a radius of $\lambda/1.8$ to $\lambda/2.2$, preferably of $\lambda/1.9$ to $\lambda/2$, such as $\lambda/2.0$.

In a special embodiment, the planar metal surface (MS) has a circular hole. This hole preferably has a diameter of 1 to 20 mm, such as of 5 to 10 mm.

The circular hole is preferably situated in the center of the circle sector.

The thickness of the planar metal surface (MS) preferably lies in the range of 0.1 to 10 mm, such as 0.2 to 2 mm.

In a preferred embodiment, the metal surface comprises, particularly consists of, conductive materials such as metal (copper, aluminum, brass, stainless steel) or graphite.

Furthermore, the one end of the inner conductor (IC) must be connected with the tip (apex) of the metal surface (MS). In other words, the one end of the inner conductor (IC) is connected with the tip of the metal surface (MS), which is assigned to the angle of 1° to 180°. In this connection, the inner conductor (and thus the shaft) is preferably firmly connected with the metal surface (MS). Preferably, the inner conductor (IC) describes an angle between 0° and 180°, preferably between 10° and 90°, particularly between 25° and 55°, with the plane of the metal surface (MS). In a special embodiment, the angle amounts to between 30° to 40°.

The method described comprises heating any plastic, particularly duroplastic and/or thermoplastic polymers that are reinforced with carbon fibers, and all processes related to this. Thus, conventional autoclave technology can also be operated with such a method and such a microwave antenna (MA), in order to heat the structure in a short time and in energy-efficient manner. The method described, and the microwave antenna (MA), can particularly be used in so-called tape-laying processes. In these processes, the invention can be utilized in order to heat and/or cure the polymer directly after the tape is laid down. Furthermore, the method according to the invention and/or the microwave antenna (MA) can be used to completely consolidate the entire carbon fiber-reinforced structure after it has been laid.

EXAMPLES

Figure 1:
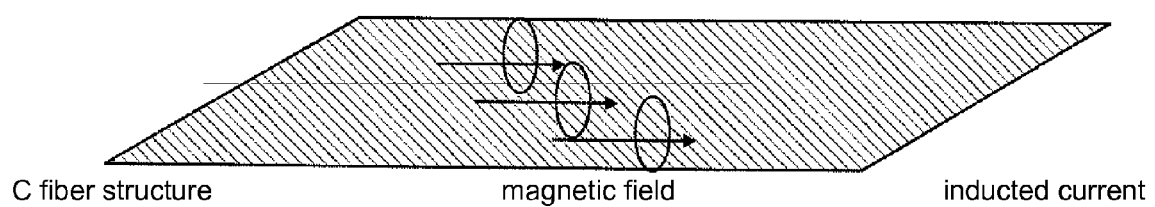
FIG. 1 illustrates a sketch of the electrical field of the C fiber structure.
Figure 2A:
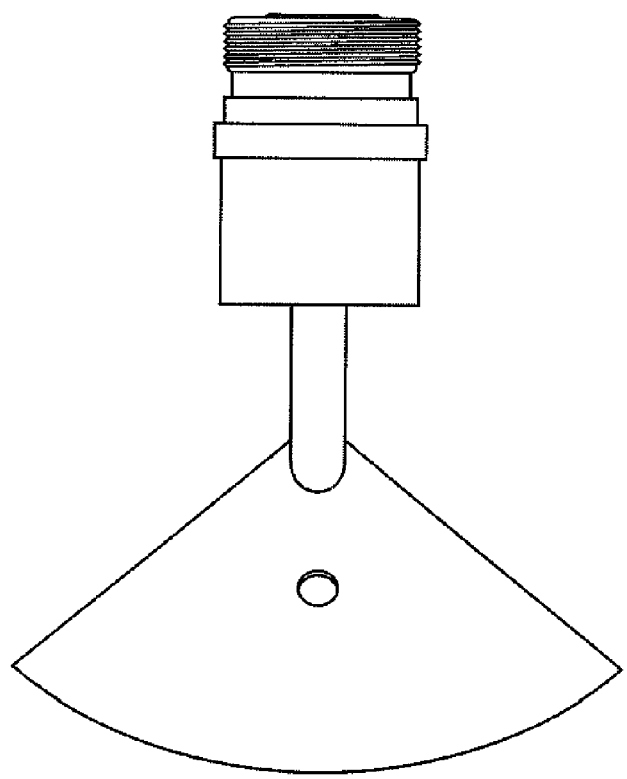
FIGS. 2A-B illustrates a Microwave antenna.
Figure 2B:
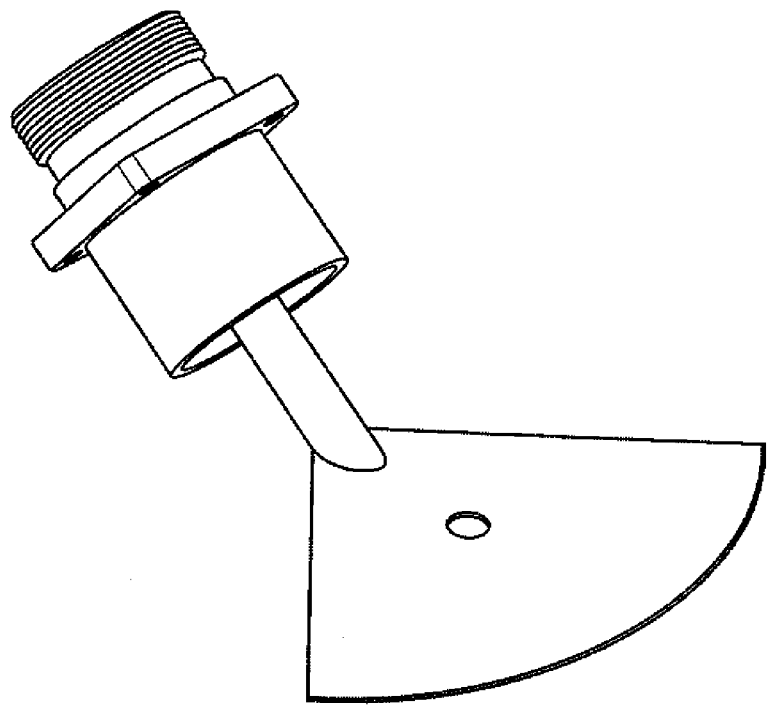
Figure 3:
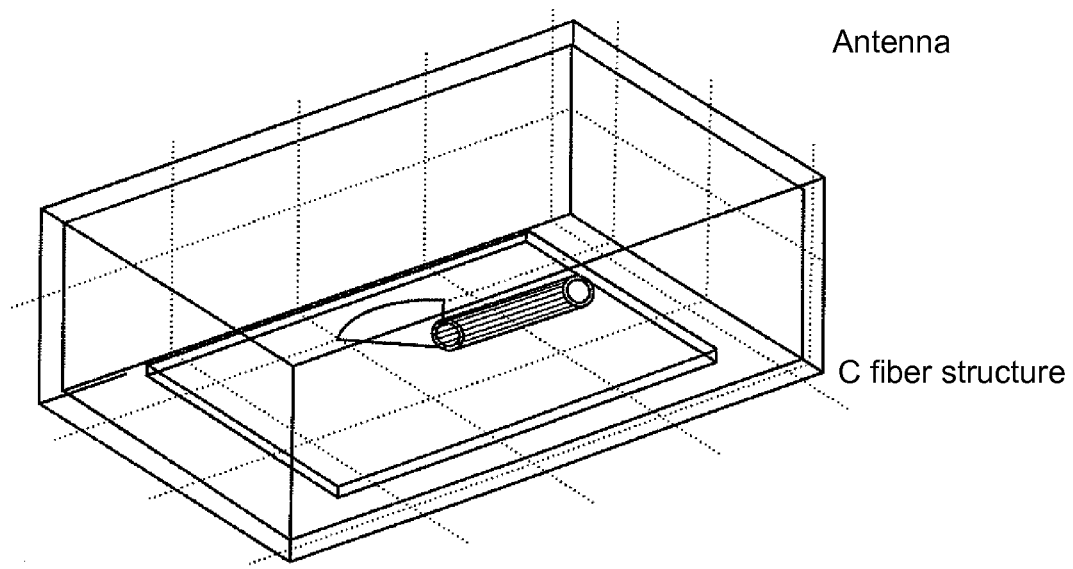
FIG. 3 illustrates the structure of the arrangement.

Experiments were conducted concerning heating of carbon fiber structures with a polyetheretherketone matrix (PEEK). The fiber/plastic composite material contained 32 layers of unidirectional carbon fiber structures, layered in any desired orientation. It was heated to a temperature of 400° C. using the antenna shown in FIGS. 2a and 2b (designed for 2.45 GHz, i.e., a wavelength of about 12 cm). For this, a power of about 400 W and an irradiation time of a few seconds (<5 s) were required. The distance of the antenna from the carbon fiber structure was 5 mm during heating (see FIG. 3).

Figure 4A:
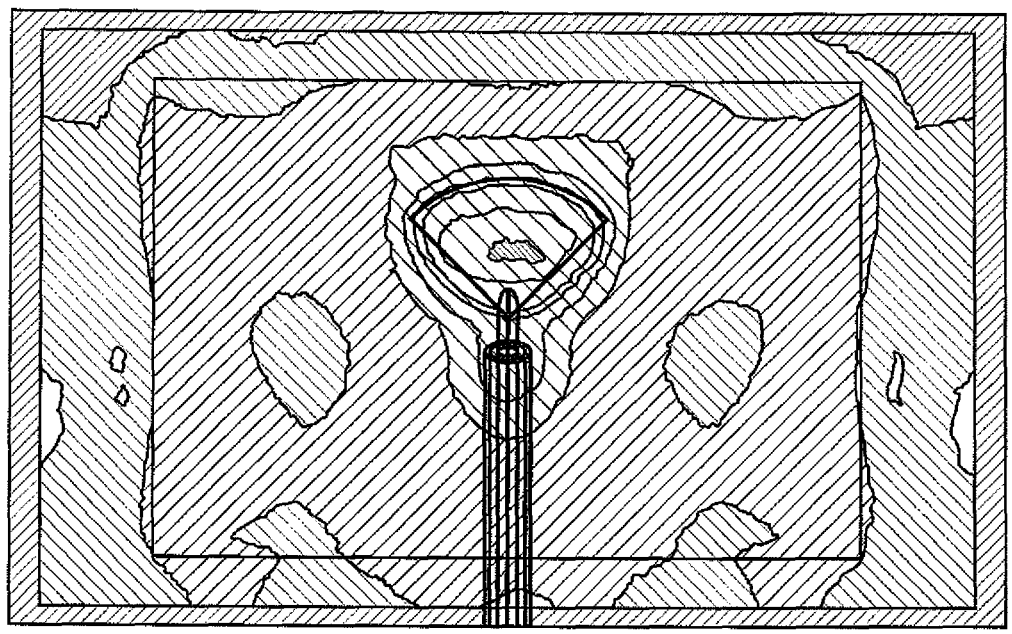
FIGS. 4A-B illustrates (a): a Magnetic Field, and (b): Heating the carbon fiber structure.
Figure 4B:
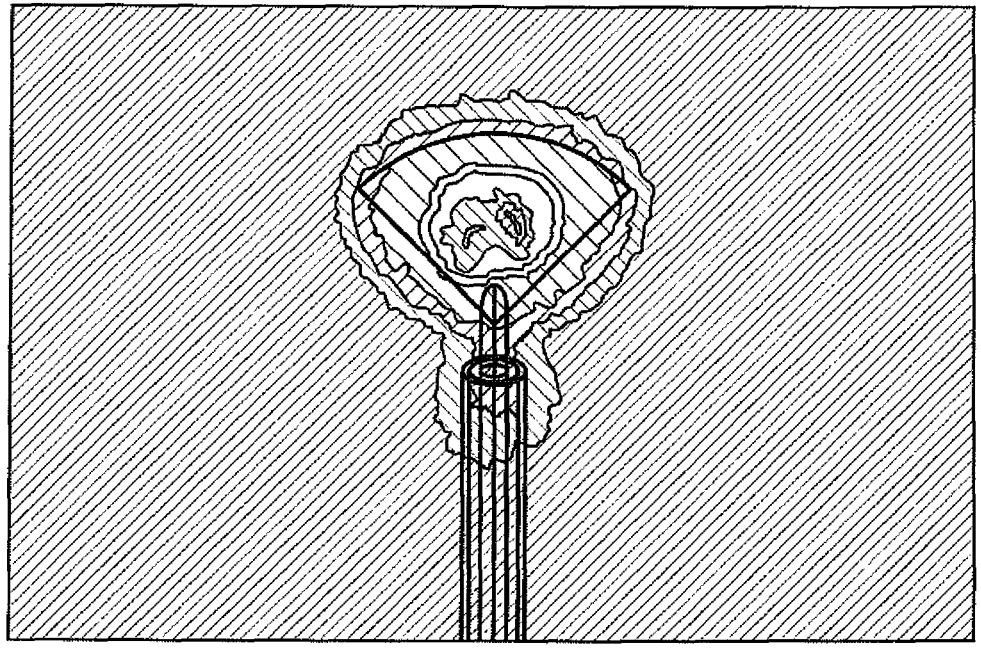

FIG. 4a shows the magnetic field that occurs, and FIG. 4b shows the ohmic heating that results from this. The two figures agree very well, i.e., regions of great magnetic field intensity result in strong heating.

Figure 5:
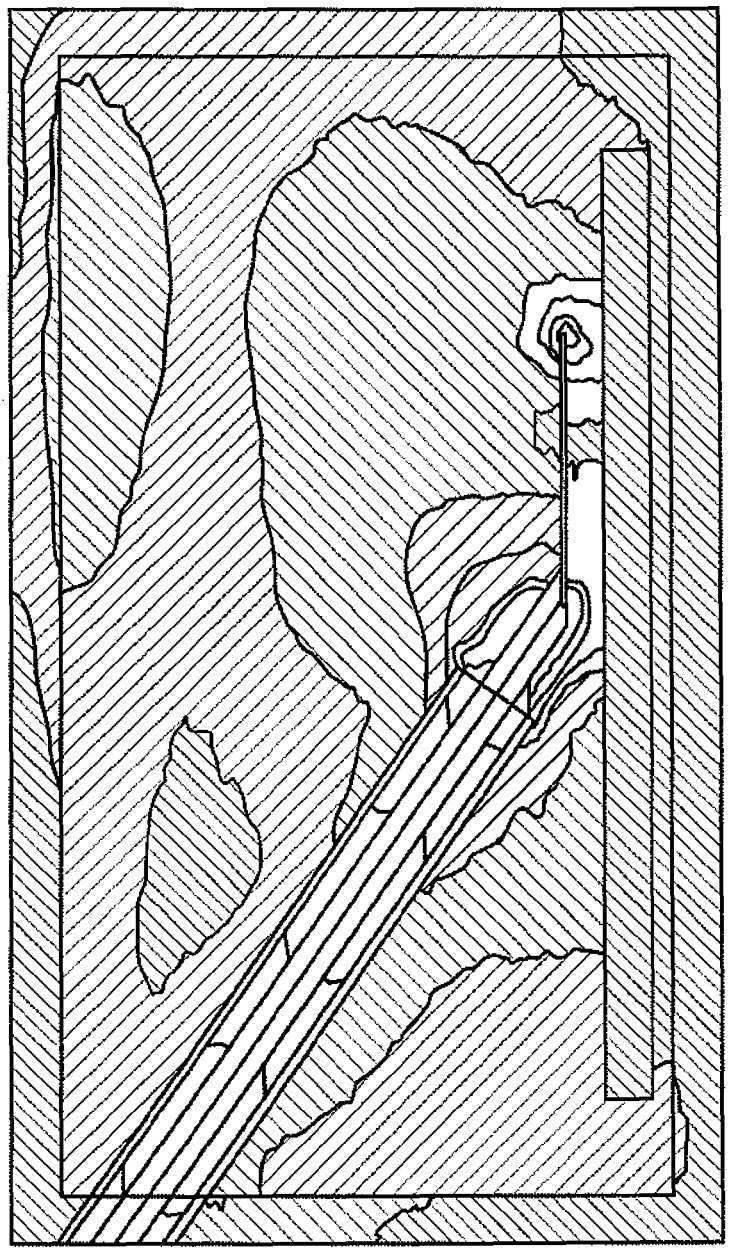
FIG. 5 illustrates an Electrical Field.

FIG. 5 shows the related electrical field. The electrical field is greatest at the transition of coaxial feed line to metal surface, and very small in the region in which the carbon fiber structure is heated, i.e., the magnetic field, not the electrical field, is what heats the carbon fiber structure, and thus the entire fiber/plastic composite material.

The invention claimed is:

1. Method for heating a fiber/plastic composite material (FPC) comprising at least one layer (L) of carbon fibers (F) in a plastic matrix (P), comprising: inducing a magnetic field (MF) by means of a microwave antenna (MA) in the fiber/plastic composite material (FPC), and the field direction of the magnetic field (MF) runs in a plane of the layer (L) of carbon fibers (F) and wherein only one magnetic field direction is present during heating of the fiber/plastic composite material (FPC), and that this direction runs in the plane of the layer (L) of carbon fibers (F).

2. Method according to claim 1, characterized in that the induced electrical current (EC) runs orthogonal to the plane of the layer (L) of carbon fibers (F).

3. Method according to claim 1, characterized in that the plastic matrix (P) is/are a duroplastic and/or a thermoplastic.

4. Method according to claim 1, characterized in that the microwave antenna (MA) is a microwave antenna wherein the microwave antenna (MA) comprises a shaft (S) and a planar metal surface (MS), wherein
    (a) the shaft (S) comprises an inner conductor (IC) and an outer conductor (OC), wherein the inner conductor (IC) and the outer conductor (OC) are separated by means of a dielectric (D), and the inner conductor (IC) and outer conductor (OC) run coaxial to one another,
    (b) the metal surface (MF) has the shape of a circle sector (CS) with an angle of 1° to 180° and a radius of 1 cm to 60.0 cm,
    (c) one end of the inner conductor (IC) is connected with the tip of the metal surface (MS) that is assigned to the angle of 1° to 180°, wherein the inner conductor (IC) forms an angle between 0° and 180° with the plane of the metal surface (MS), and
    (d) the shaft (S) has only the inner conductor (IC) 0.1 cm to 25.0 cm in front of the shaft end that is connected with the metal surface (MS).

5. Method according to claim 1, characterized in that the microwave antenna (MA) is placed 50 mm or less above the fiber/plastic composite material (FPC).

6. Microwave antenna (MA) comprising a shaft (S) and a planar metal surface (MS), wherein
    (a) the shaft (S) comprises an inner conductor (IC) and an outer conductor (OC), wherein the inner conductor (IC) and the outer conductor (OC) are separated by means of a dielectric (D), and the inner conductor (IC) and outer conductor (OC) run coaxial to one another,
    (b) the metal surface (MF) has the shape of a circle sector (CS) with an angle of 1° to 180° and a radius of 1 cm to 60.0 cm,
    (c) one end of the inner conductor (IC) is connected with the tip of the metal surface (MS) that is assigned to the angle of 1° to 180°, wherein the inner conductor (IC) forms an angle between 0° and 180° with the plane of the metal surface (MS)
    (d) the shaft (S) has only the inner conductor (IC) 0.1 cm to 25.0 cm in front of the shaft end that is connected with the metal surface (MS).

7. Microwave antenna (MA) according to claim 6, characterized in that the metal surface (MS) comprises an electrically conductive material, preferably copper, brass, bronze, aluminum and/or stainless steel.

8. Microwave antenna (MA) according to claim 6, characterized in that
    (a) the radius is $\lambda/1.8$ to $\lambda/2.2$
    and/or
    (b) the shaft (S) has only the inner conductor (IC) $\lambda/2$ to $\lambda/6$ in front of the shaft end that is connected with the metal surface (MS),
    wherein "$\lambda$" is the wavelength of the microwave with a length of 0.1 cm to 100 cm.

* * * * *